United States Patent [19]
Torbet et al.

[11] Patent Number: 6,104,494
[45] Date of Patent: Aug. 15, 2000

[54] REFLECTOMETER FOR A ROASTING SYSTEM

[75] Inventors: Philip A. Torbet, San Rafael, Calif.; Edward M. Granger, Rochester, N.Y.

[73] Assignee: Fresh Roast Systems, Inc., Petaluma, Calif.

[21] Appl. No.: 09/302,037

[22] Filed: Apr. 29, 1999

Related U.S. Application Data

[60] Provisional application No. 60/083,814, May 1, 1998.

[51] Int. Cl.[7] ................................ G01J 3/46; G01J 3/50
[52] U.S. Cl. .......................................... 356/425; 250/226
[58] Field of Search .................. 356/402, 425, 356/445, 364, 369, 351, 407, 73; 250/226

[56] References Cited

U.S. PATENT DOCUMENTS

| | | | |
|---|---|---|---|
| 3,867,039 | 2/1975 | Nelson | 356/178 |
| 4,110,485 | 8/1978 | Grubbs et al. | 426/595 |
| 4,707,138 | 11/1987 | Coatney | 356/402 |
| 4,849,625 | 7/1989 | Porzi | 250/226 |
| 5,034,609 | 7/1991 | Satake et al. | 250/339 |
| 5,502,559 | 3/1996 | Powell et al. | 356/73 |
| 5,724,882 | 3/1998 | Gallas et al. | 99/285 |

*Primary Examiner*—Frank G. Font
*Assistant Examiner*—Michael P. Stafira
*Attorney, Agent, or Firm*—Townsend and Townsend and Crew LLP

[57] ABSTRACT

A reflectometer for use with a roasting system includes a laser diode, a lens and a photodetector. The laser diode emits a laser beam having a wavelength corresponding to the maximum actinic response of the items being roasted. The laser beam is reflected off a mirror into a collecting volume of the items being roasted. The items being roasted then reflect light through the lens and to the photodetector. The system also includes a cross polarizer and a narrow-band filter between the lens and photodetector in order to filter undesirable reflected light. The collecting volume and the detector are within the searchlight cone defined by the lens and its focal point such that the reflected light from the collecting volume has a constant illumination.

10 Claims, 3 Drawing Sheets

REFLECTOMETER FOR A ROASTING SYSTEM

This application claims priority from U.S. Provisional Application No. 60/083,814, filed May 1, 1998, the disclosure of which is incorporated by reference.

BACKGROUND OF THE INVENTION

1. Field of the Invention

The present invention relates to a reflectometer, and more specifically, a reflectometer for a roasting system, in particular, a coffee roasting system.

2. Description of the Prior Art

Roasting apparatus for roasting a variety of materials, such as fresh or green coffee beans, peanuts, almonds and the like, is known. When roasting coffee, the taste and fragrance of coffee depend largely on how the coffee beans have been roasted, as well as the degree to which the coffee beans have been roasted and how quickly following roasting the beans are consumed by brewing coffee with them. It is desirable to produce roasted coffee beans that are consistent in taste and fragrance.

Presently, in order to ensure proper roasting, the experienced roastmaster commonly roasts green coffee beans at a central location for distribution to multiple destinations for sale and consumption. Since coffee beans are presently roasted at a central plant for sale at multiple retail locations, such as supermarkets, stores and specialty shops, as well as coffee and espresso bars, the roasted beans must be stored and shipped before they reach the consumer. Not only is this time-consuming and costly, but in addition to cost and transportation reasons, it is not feasible to effectively distribute coffee that is roasted on a given day for sale at the various retail establishments on the same day. Thus, coffee beans presently for sale at retail establishments are seldom fresh and they are typically several days to several weeks old before they reach the consumer. This compromises the quality and especially the aroma of the coffee. Additionally, it increases the cost of the coffee because of the need to make relatively many deliveries from the roasting plant to the retail locations.

Ideally, coffee beans would be roasted at individual retail locations so that the roasted beans would be freshest when they ultimately reach the consumer. Unfortunately, roasting coffee beans at individual retail locations is unfeasible because of the need to have the roasting process supervised by an experienced roastmaster. The daily roasted coffee bean sales volume is typically too small to justify the high cost of a roastmaster. A roastmaster is required to control the roasting process based upon the change in color of the beans. While the color of the beans is related to the taste profile of the beans, color may be as important as the taste profile since the color of the beans is a characteristic that the average consumer would notice, i.e., it is the most prominent feature of the roasted bean. As little as a ten second variance in the time of roasting can result in a dramatic difference in the color of the beans. Hence, a key problem is the replicating of consistent roasting of green coffee beans. This problem is especially acute in batch roasting processes versus continuous roasting processes.

Use of a reflectometer with coffee bean roasting has been considered. However, the use of conventional reflectometers would require that the reflectometer make contact with the bean in order to measure the color of the bean. Additionally, this contact must take place in a plane as opposed to measuring the beans in volume. Hence, the roasting process would have to be stopped and beans selectively placed in a plane and contacted with the reflectometer in order to measure their color. Such use of conventional reflectometers would not be practical.

SUMMARY OF THE INVENTION

A reflectometer in accordance with the present invention addresses the shortcomings of the prior art.

In accordance with one aspect of the present invention, a reflectometer for use in a roasting process for a plurality of items includes a light source, a lens and a detector for detecting light reflected from the items through the lens. In a preferred embodiment, the system further includes a polarizer and a narrow-band filter located between the lens and the detector for eliminating undesired reflected light.

In accordance with another aspect of the present invention, the system further includes an integrator, an inverter and a bar graph display in communication with the detector and a programmable logic controller of the roasting system.

In use, the plurality of items being roasted pass through the searchlight cone defined by the lens and its focal point and are illuminated by the light source. Light is reflected from the items through the lens and to the detector. Based upon the searchlight principle, which will be more fully explained herein, the illumination within the searchlight cone is absolutely constant to its focal point and hence the characteristics within the reflected light may be accurately measured without the need to worry about a decrease in illumination of the reflected light based upon travel of the light.

As the items are roasted, their color changes. As the color changes, the reflectivity of the items being roasted decreases. Hence, the roasting process may be accurately controlled.

In accordance with another aspect of the present invention, the wavelength of the light source is chosen to be in the region of maximum actinic response. Other features and advantages of the present invention will be understood upon reading and understanding the detailed description of the preferred exemplary embodiments found herein below, in conjunction with reference to the drawings, in which like numerals represent like elements.

DESCRIPTION OF THE PREFERRED EXEMPLARY EMBODIMENTS

Figure 1:
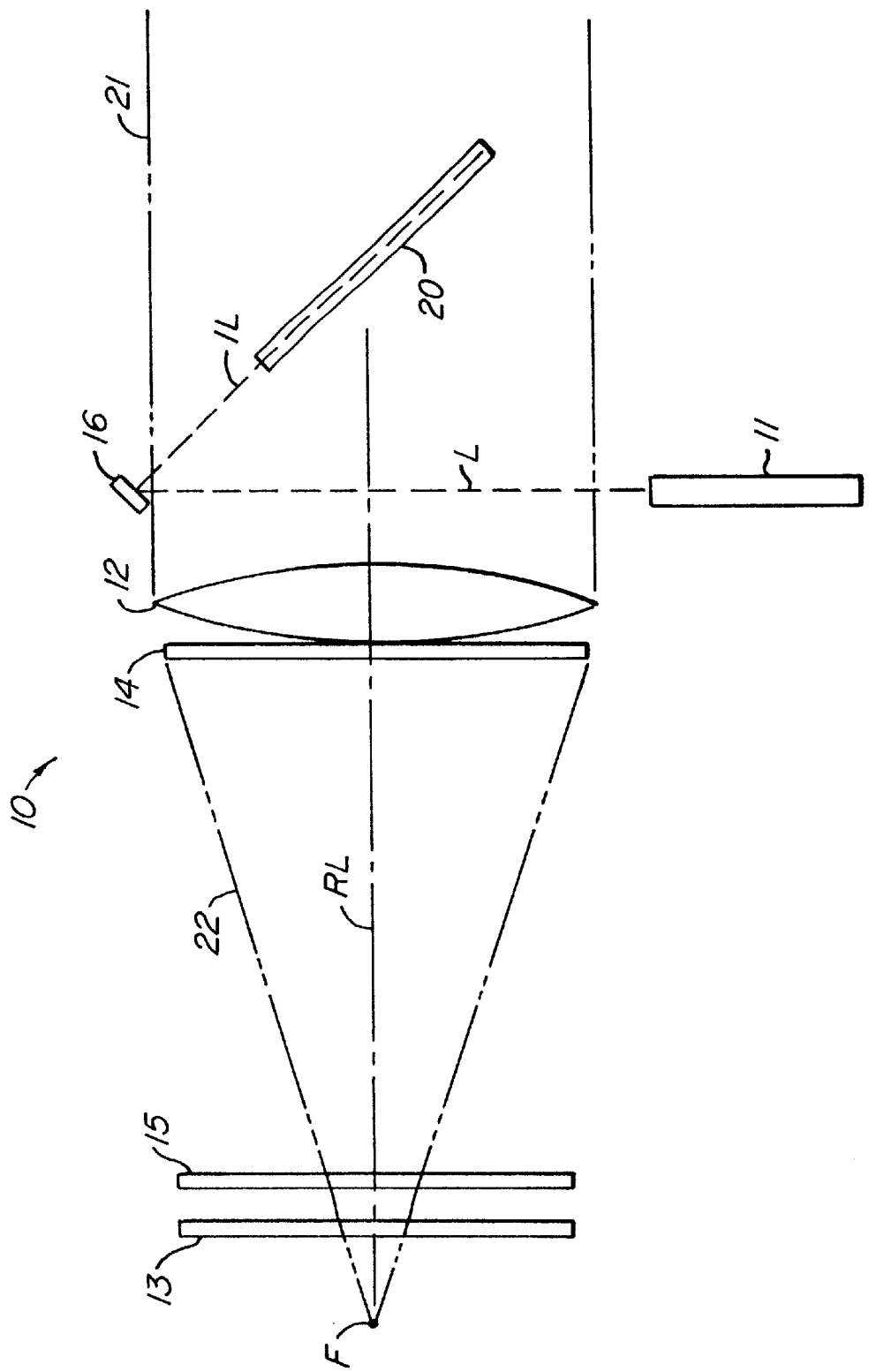
FIG. 1 is a schematic diagram of a reflectometer in accordance with the present invention.

FIG. 1 schematically illustrates a reflectometer system 10 in accordance with a preferred embodiment of the present invention. Reflectometer system 10 includes an illumination source 11, preferably in the form of a laser diode that produces a collimated laser beam. The system further includes a lens 12 and a detector 13, preferably in the form of a photodetector. In the preferred embodiment illustrated in FIG. 1, the reflectometer system further includes a cross-polarizer 14 and a narrow-band filter 15. Finally, reflectometer system also preferably includes a mirror 16.

Figure 3:
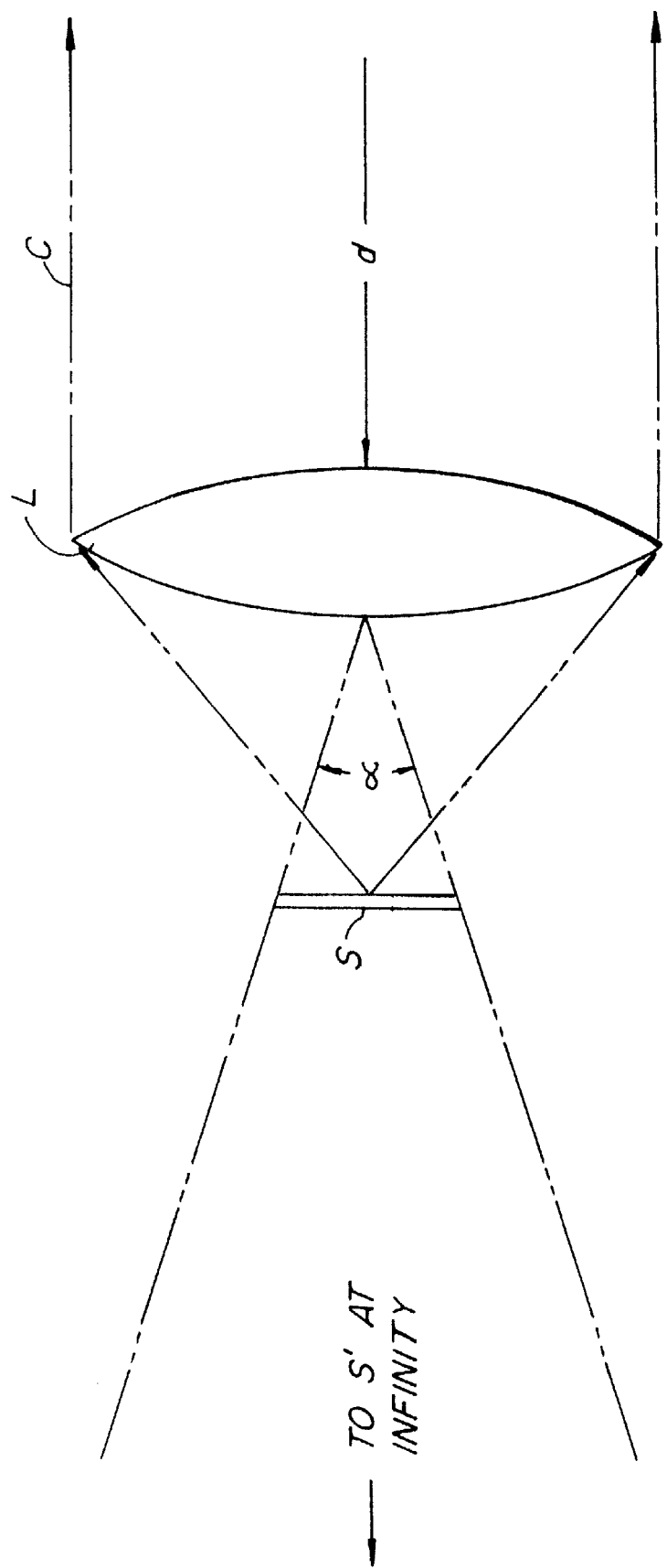
FIG. 3 is a schematic diagram illustrating the optics of a searchlight in accordance with the searchlight principle.

Reflectometer system 10 is arranged such that collecting volume 20 of items whose reflections are to be monitored is placed within a collimated searchlight view 21. This arrangement is based upon the searchlight principle of optics. Briefly, with reference to FIG. 3, according to the searchlight principle when a source S is placed at the focal point of lens L, an image S' will be located at infinity. Since S subtends an angle α from L, the image S' will also subtend at an angle α. Now the illumination at a point on the axis will be determined by the brightness of the image and the solid angle subtended by the image. Thus, for points near the lens, the illumination is given by E=TB Ω. B represents the brightness of source S (since the brightness of an image equals the brightness of the object) and Ω represents the solid angle subtended by the image. For a point at lens L, it is obvious that the solid angle Ω subtended by the image S is exactly equal to the solid angle subtended by the source S from the lens. Since S' is at infinity, this angle will not change as the reference point is shifted a short distance along the axis away from the lens, and the illumination will remain constant in this region. However, at a distance D equal to the lens diameter divided by α, the source image will subtend the same angle as the diameter of the lens. At points more distant than D, the size of the solid angle subtended by the source of illumination will be limited by the lens diameter. This solid angle will be equal to the area of the lens divided by $d_2$ (d=the distance from the lens) and the illumination beyond distance d will fall off with the square of the distance d to the lens. Accordingly, illumination within the searchlight cone defined by the lens focal point is constant anywhere within the cone. The information relating to the searchlight principle may be found in various optics textbooks. The above information may be found in *"Modern Optical Engineering—The Design Of Optical Systems"* by Warren J. Smith, pp. 203–206, McGraw Hill Book Company (1966), which is hereby incorporated by reference for all purposes.

Reflectometer system 10 applies the inverse of the searchlight principle. Light reflected off items within the collimated view of the searchlight, which is defined by the diameter of the lens and is represented by cylinder C in FIG. 3, focuses at the focal point of the lens. Thus, light reflected from objects within the cylinder defined by the lens diameter will come to focus at the lens focal point. Placing a detector at or near that focal point will result in maximum collection of reflected light.

Accordingly, collecting volume 20 is arranged within cylinder 21, which represents the collimated searchlight view, and is illuminated by light from illumination source 11 reflected from mirror 16. Light reflected from the collecting volume 20 passes through lens 12 and is detected by detector 13. Detector 13 is therefore placed at the focal point F defined by lens 12 or closer to the lens such that it is within a searchlight cone 22 and thus the light reflected from collecting volume 20 has a constant illumination.

Reflectometer system 10 is ideally suited for use in detecting items being roasted, such as coffee beans, peanuts, almonds, grains, and the like. One such roasting system is disclosed in U.S. patent application Ser. No. 60/065,083, which is hereby incorporated by reference in its entirety for all purposes.

Thus, for example, coffee beans may be roasted in a roasting system. In the roasting system, the beans tumble within a rotating drum as they are roasted. With the arrangement of the reflectometer system as illustrated in FIG. 1, the tumbling beans will pass through collecting volume 20. Light L produced by illumination source 11 will be reflected from mirror 16 and illuminate beans within collecting volume 20 with incident light IL. Light RL will reflect from the beans and pass through lens 12, cross-polarizer 14, narrow-band filter 15 and be detected by detector 13. The light from illumination source 11 does not have to be reflected from the mirror but does have to be directed at collecting volume 20 such that it produces reflected light from the beans that will pass through the lens and be detected by detector 13. Furthermore, the light from illumination source 11 must not interfere with light reflected from the beans.

As stated previously, preferably illumination source 11 is a laser diode. The laser beam produced by laser diode appears to emanate from a point within the laser and thus appears as a point source that is polarized. Thus, the beans within collecting volume 20 will be illuminated as with a searchlight and the light reflected from the beans will have a constant illumination to the focal point of the lens and therefore reflected light received by detector 13 will have a constant illumination, i.e. the illumination will not diminish as it travels from the lens to the detector.

The wavelength of the laser is chosen to correspond to maximum actinic response of the beans. Measuring the roasting of the coffee beans based upon the maximum actinic response is more accurate and more easily replicated than measuring color. For coffee beans, the maximum actinic response is within the 750–790 nm range. In this range, reflectivity of the beans experiences the greatest rate of change as the color changes during the roasting. As the beans roast, they darken and therefore their reflectivity decreases. Thus, a 3 mW laser diode that produces an infrared 780 nm wavelength laser beam is preferably used. The laser may be chopped and therefore may use a heterodyne circuit.

At the selected wavelength, because it is chosen such that it corresponds to the maximum actinic response, this wavelength most closely correlates to taste. Thus, as the beans roast, the reflected power of the reflected light at the selected wavelength, in this case, 780 nm, is monitored by detector 13.

In order to ensure that only the desired wavelength of light is detected by detector 13, the narrow-band filter 15 is used to filter out light having different wavelengths. Such narrow band filters are known in the art and for example may be integral with the packaging of the detector or may be a coating over the detector.

As the coffee beans roast, oil develops on the surface of the beans. Thus, light reflected by the oil, as opposed to the bean surface, will have a different polarization and thus cross-polarizer 14 will filter out these specular reflections produced by the oil film.

Thus, the illumination source in the form of a laser diode emits an infrared laser beam having a wavelength of 780 nm that is reflected by mirror 16 into collecting volume 20, which are coffee beans in this example, tumbling within a rotating roasting drum. Light is reflected from the coffee beans through lens 12 and is detected by detector 13. Since both the collecting volume and the detector are within the collimated searchlight view 21, i.e. not beyond the focal point of the lens, the light reflected by the beans has a constant illumination. In order to ensure that only the desired light reflected by the beans is detected by the detector, cross-polarizer 14 filters out specular reflections created by any oil formed on the bean. Additionally, narrow-band filter 15 filters out reflected light having a wavelength other than 780 nm.

If peanuts, or almonds, or some other item were being roasted, a different wavelength may be selected based upon the item's maximum actinic response.

Figure 2:
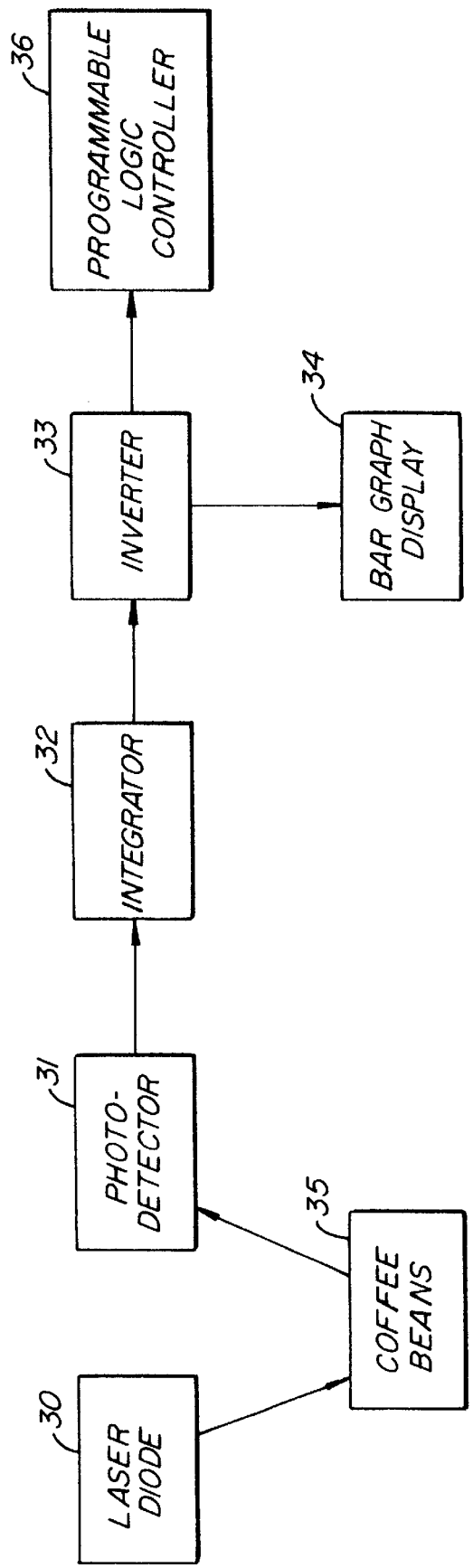
FIG. 2 is a block diagram illustrating the circuitry of the reflectometer in accordance with the present invention.

Referring to FIG. 2, the preferred electrical circuitry for the reflectometer includes a laser diode 30 (representing illumination source 11), a photodetector (representing detector 13), an integrator 32, an inverter 33 and a bar graph display 34.

As previously described, laser diode 30 emits a laser beam that is incident upon, in this example, coffee beans 35 being roasted. The laser beam may be directly incident upon the coffee beans or may be, as previously described in the preferred embodiment, reflected from the mirror upon the coffee beans. The light emitted by the laser diode must be directed such that it does not interfere with light reflected from the coffee beans.

Light is then reflected from the coffee beans and, preferably after passing through a cross-polarizer and a narrow-band filter to eliminate undesired reflected light beams, the reflected light is detected by photodetector 31. The photodetector generates curves of light intensity and converts the received light into a voltage or current that is passed along to integrator 32.

Integrator 32 is preferably a transimpedance amplifier. Thus, the output voltage of the integrator is the integral of the input current with respect to time and, based upon the capacity of the roasting drum, integrator 32 produces a slowly changing signal.

The signal produced by integrator 32 is passed along to inverter 33. As the reflected light detected by the detector goes down, the current or voltage signal output by the photodetector correspondingly goes down. Inverter 33 is used to invert the signal such that as the signal from the photodetector decreases, the inverter actually increases the ultimate output signal.

The inverted output signal is then passed along to bar graph display 34, which preferably comprises a plurality of LED sequential bars in the form of a bar graph. These individual LEDs are then lit corresponding to the inverted output signal to allow monitoring of the detected reflectivity.

Finally, the output signal is also passed from the inverter to a programmable output controller 36 within the roasting system. The programmable logic controller has a shut-off threshold built-in for each type of coffee bean being roasted. Thus, based upon the type of coffee bean being roasted, the programmable logic controller shuts off the roasting process when the output signal reaches the appropriate threshold indicating that the roasting of the coffee beans is finished.

Additionally, programmable logic controller 36 preferably includes logic that controls the reflectometer such that it selectively differentiates roasting product (beans, peanuts, almonds, grains, etc.) from the background such that the reflectometer only registers solid product reflectivity. Objects outside the searchlight cone will not reflect signals back to the sensor based on the logic. For example, the sensor will not detect the wall of the rotating roasting drum because it is outside the sensing range of the unit, i.e., outside the searchlight cone.

In accordance with another aspect of a preferred embodiment of the present invention, since current to laser diode 30 may vary slightly, thereby causing the reflected signal to vary, reflectometer system 10 preferably includes a signal feedback conditioning circuit in order to maintain an accurate laser output signal. Such a signal feedback conditioning circuit is generally known in the art and ensures that in real time, the laser output is constant such that the reflected signature is accurate thereby helping ensure precise reflective sensing.

Accordingly, as can be seen, the present reflectometer system allows for consistent and easily replicable roasting of coffee beans from batch to batch. As the coffee beans are roasted, their color changes. As the color changes, the amount of light reflected decreases. Since the wavelength of the light being supplied to the beans is selected based upon maximum actinic response, it can be easily determined when the roasting process is complete, based upon detection of reflected light beams of the selected wavelength. Thus, the roasted beans consistently have the desirable color and aroma, which are important characteristics easily noticed by consumers, as well as the desired taste.

The reflectometer system allows for the roasting of items such as coffee beans, peanuts, almonds and the like, in small batches without the need for a roastmaster or individual operator control. A programmable logic controller controls the roasting process based on signals received from the reflection of the items being roasting and shuts off the roasting system based upon the built-in threshold.

Although the invention has been described with reference to specific exemplary embodiments, it will be appreciated that it is intended to cover all modifications and equivalents within the scope of the intended claims.

What is claimed is:

1. A reflectometer for a roasting system that roasts a plurality of items, the reflectometer comprising:

a. an illumination source adjacent a roasting drum for illuminating items as they pass the illumination source;

b. a lens adjacent the roasting drum through which light reflected from the items passes; and c. a detector aligned along an axis of the lens for detecting reflected light that passes through the lens, the detector being between the lens and a focal point defined by the lens.

2. The reflectometer of claim 1 further comprising a cross-polarizer located between the lens and the detector.

3. The reflectometer of claim 2 further comprising a narrow band pass filter between the cross-polarizer and the detector.

4. The reflectometer of claim 3 wherein the illumination source is a laser diode.

5. The reflectometer of claim 4 further comprising an integrator and an inverter in electrical communication with the detector.

6. The reflectometer of claim 5 wherein the integrator is a transimpedance amplifier.

7. The reflectometer of claim 5 further comprising a bar graph display in electrical communication with the inverter for displaying an output signal produced by the detector.

8. A method of controlling a roasting process for roasting a plurality of items, the method comprising:

providing a roasting system including a roasting drum;

illuminating items within the roasting drum with an illumination source;

providing a lens adjacent the roasting drum such that light reflected from the items passes through the lens;

providing a detector along an axis of the lens between the lens and a focal point of the lens;

detecting reflected light with the detector;

monitoring the power of the reflected light detected by the detector; and terminating the roasting process when the power of the reflected light reaches a predetermined threshold.

9. The method of claim 8 further comprising illuminating the items with light having a wavelength corresponding to maximum actinic response of the items being roasted.

10. The method of claim 9 further comprising providing a cross-polarizer between the lens and the detector for filtering undesirable light.

* * * * *